United States Patent [19]

Bunn

[11] Patent Number: 4,782,744

[45] Date of Patent: Nov. 8, 1988

[54] BEVERAGE BREWER AND HOT WATER DISPENSER

[75] Inventor: George R. Bunn, Springfield, Ill.

[73] Assignee: Bunn-O-Matic Corporation, Springfield, Ill.

[21] Appl. No.: 145,908

[22] Filed: Jan. 20, 1988

[51] Int. Cl.⁴ .............................................. A47J 31/40
[52] U.S. Cl. .......................................... 99/307; 99/290; 99/291; 99/294
[58] Field of Search ................ 99/279, 280, 290, 291, 99/292, 293, 294, 295, 299, 300, 304, 307; 426/433

[56] References Cited

U.S. PATENT DOCUMENTS

| | | | |
|---|---|---|---|
| 3,793,934 | 2/1974 | Martin | 99/304 |
| 4,094,233 | 6/1978 | Martin | 99/305 |
| 4,464,981 | 8/1984 | Stover | 99/280 |
| 4,603,620 | 8/1986 | Daugherty | 99/300 |
| 4,603,621 | 8/1986 | Roberts | 99/307 |

Primary Examiner—Robert W. Jenkins
Attorney, Agent, or Firm—Lockwood, Alex, FitzGibbon & Cummings

[57] ABSTRACT

A combined beverage (coffee and tea) brewer and hot water dispenser wherein the hot water for both brewing and dispensing is supplied from the upper portion of the same hot water reservoir tank. The cold water supply to the bottom portion of the reservoir tank for displacing and replacing hot water for brewing is separate from that for displacing and replacing hot water for dispensing whereby hot water may be dispensed and replaced at anytime, including during the brew cycle, without interference with brewing.

7 Claims, 2 Drawing Sheets

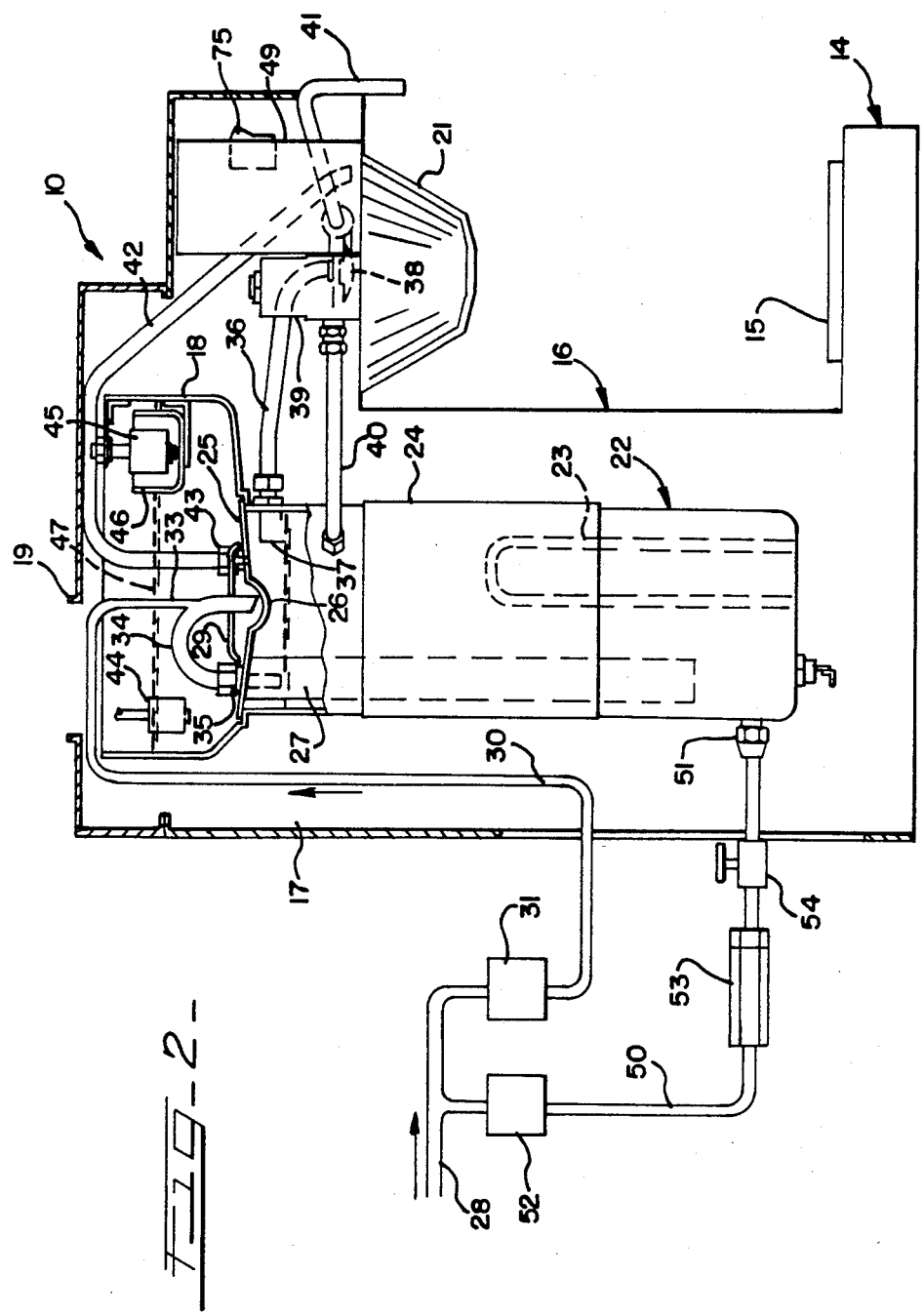

BEVERAGE BREWER AND HOT WATER DISPENSER

This invention relates, generally, to an automatic coffee brewer which has a separate faucet for dispensing hot water. More specifically, the invention relates to such a coffee brewer wherein the hot water for both brewing and dispensing is supplied from the same hot water reservoir or tank with the hot water for brewing and the hot water for dispensing being displaced and replaced by separately supplied cold water to the reservoir or tank. Thus, hot water may be dispensed at any time from the faucet and simultaneously replaced with cold water without interfering with the automatic brew cycle.

Heretofore, automatic coffee brewers have been provided of the type having a hot water reservoir or tank wherein a supply of hot water for brewing is maintained and which also have a separate faucet from which hot water may be withdrawn separately for making cups of tea, cocoa, soup, etc. However, in these prior machines such as disclosed in U.S. Pat. No. 4,464,981, dated Aug. 4, 1984, hot water cannot be dispensed from the reservoir and simultaneously replaced with cold water without interfering with the brew cycle by diminishing the normal quantity of hot water going to the brewing funnel. The combination beverage brewer and hot water dispenser of the present invention eliminates this problem of interference. There are other known coffee brewers which have separate faucets from which hot water may be dispensed but which have hot water supply tanks which are separate from the hot water reservoirs from which hot water for brewing is supplied. Such coffee brewers are disclosed in U.S. Pat. No. 4,603,620, dated Aug. 5, 1986. The combination beverage brewer and hot water dispenser of the present invention eliminates the need for a separate hot water supply tank for the dispensing faucet.

Accordingly, the object of the present invention, generally stated, is the provision of a combination beverage brewer and hot water dispenser from which hot water may be dispensed from a single supply reservoir and simultaneously replaced with cold water without interfering with the automatic brew cycle whether or not the brew cycle is in progress. Certain additional and more specific objects of the invention will be apparent to those skilled in art in light of the following detailed description of a preferred embodiment of the invention taken with the accompanying drawings wherein:

FIG. 2 is a partially diagrammatic view taken on line 2—2 of FIG. 1, partially in section and partly in elevation;

Figure 1:
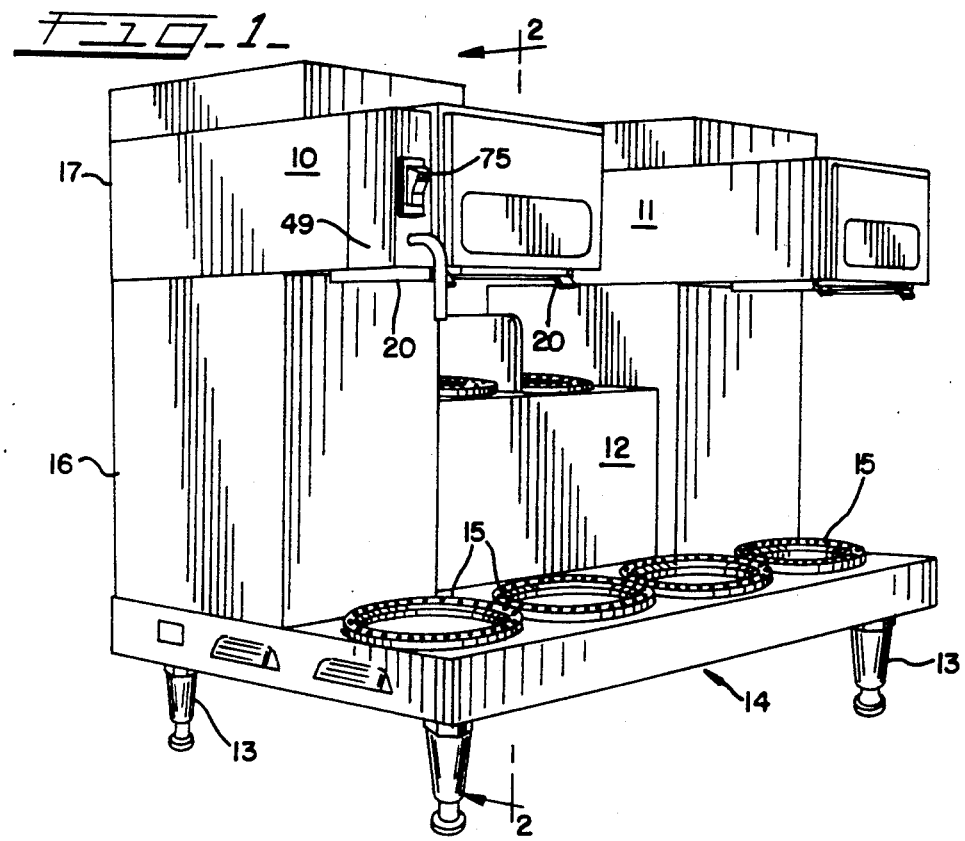
FIG. 1 is a perspective view of a combination beverage brewer and hot water dispenser forming one embodiment of the invention.

In FIG. 1 a coffee (or tea) brewer is shown which comprises a left hand brewer indicated generally at 10, a right hand brewer indicated generally at 11 with intermediate warming stations indicated generally at 12. The present invention is specifically embodied in the brewer 10 although it could also be embodied in the brewer 11, if desired. It will also be understood that the brewer 10 can be made as a separate independent stand-alone unit.

The unit shown in FIG. 1 is supported on four legs 13—13 and includes a base 14 on which the other components are mounted including four warmers 15—15 on which beakers containing coffee may be placed. The brewer 10 has an upstanding trunk 16 which supports an upper compartment 17 which contains a cold water basin 18 (FIG. 2) and other components. The compartment 17 has a top opening 19 (FIG. 2) for introducing cold water into the basin 18 when the unit is not operated in its automatic mode. The front portion of the compartment 17 overhangs the base 14 and the left hand warmer 15. The overhanging portion of the compartment 17 is provided on the underside with a pair of rails 20—20 which provide support for a brewing funnel 21 (FIG. 2) which may be inserted and withdrawn in known manner.

Referring to FIG. 2, the coffee making part of the combination brewer and hot water dispenser 10 is similar in features of construction and operation to prior automatic coffee makers such as the one disclosed in U.S. Pat. 4,094,233 dated June 13, 1978 the disclosure of which is incorporated by reference herein. In addition to the cold water basin 18 the brewer 10 has a hot water reservoir or tank 22. The tank 22 is provided with an internal resistance heater of known type 23 and an external blanket heater of known type 24. At the top, the tank 22 is provided with a lid or cover 25 which incorporates a sump 26.

A cold water inlet tube 27 is suspended from the underside of the lid 25 for introducing cold water into the bottom portion of the tank 22 during the brew cycle, the cold water being in effect dumped in batches into the upper end of the tube 27 from the basin 18.

Cold water is normally delivered to the basin 18 at the start of the brew cycle from a cold water supply 28 by way of a cold water line 30 which includes a solenoid operated valve 31. At its upper end, the cold water line 30 extends over the top of the basin 18 and then has a downwardly extending portion 33 which is joined to one leg of an inverted U-shaped siphon tube 34. The other leg of the tube 34 extends downwardly through the lid 25 and into the upper end of the cold water inlet tube 27. The connection between the lid 25 and the inverted leg of the siphon 24 is of known type and indicated at 35.

Hot water for beverage brewing is displaced and withdrawn from the upper portion of tank 22 through a hot water line 36 connected at its inlet end with a downwardly opening siphon hub fitting 37 on the interior of the tank 22. The discharge end of the hot water tube 36 extends downwardly through the underside of the overhanging portion of the compartment 17 and is provided in known manner with a sprayhead nozzle 38.

A hot water dispensing tube 40 is connected at its inlet end to the upper portion of the tank 22 somewhat beneath the opening into the fitting 37. The tube 40 extends through the upper compartment 17 to the inlet port of a solenoid operated valve 39. The inlet of a faucet 41 is connected with the outlet port of the valve 39 with its downturned discharge end located on the front of a separate compartment 49 (FIGS. 1 and 2).

In order to prevent steam pressure from accidentally building up within the tank 22, an air vent tube 42 is provided within the upper compartment 17. The tube 42 is connected at its inlet end to an opening in the lid 25 by a fitting indicated generally at 43. The opposite free end of the vent tube 42 terminates within the compartment 17 (FIG. 2).

The cold water basin 18 is provided on the interior with two float level switches 44 and 45 of known type. The float level switch 44 is a operating float level switch while the float level switch 45 is a safety float switch. In actual construction, both the of the switches 44 and 45 may be mounted adjacent each other and supported from the same bracket. The switch 45 is disposed within a high water cup 46 the upper lip of which is mounted at a level above the normal high water or full level within the basin 18 which is indicated at 47.

Cold water for displacing and replacing hot water dispensed through the faucet 41 is introduced into the bottom of the tank 22 through a cold water line 50 connected at its inlet end to the pressurized cold water supply 28 and connected at its discharge end by suitable fitting 51 to the bottom portion of the tank 22. The line 50 is provided with a solenoid operated valve 52, a flow control valve 53, and a needle valve 54 all of known types. The needle valve 54 provides for any adjustment in the control of the input water rate that may be needed to compensate for the output water rate.

Figure 3:
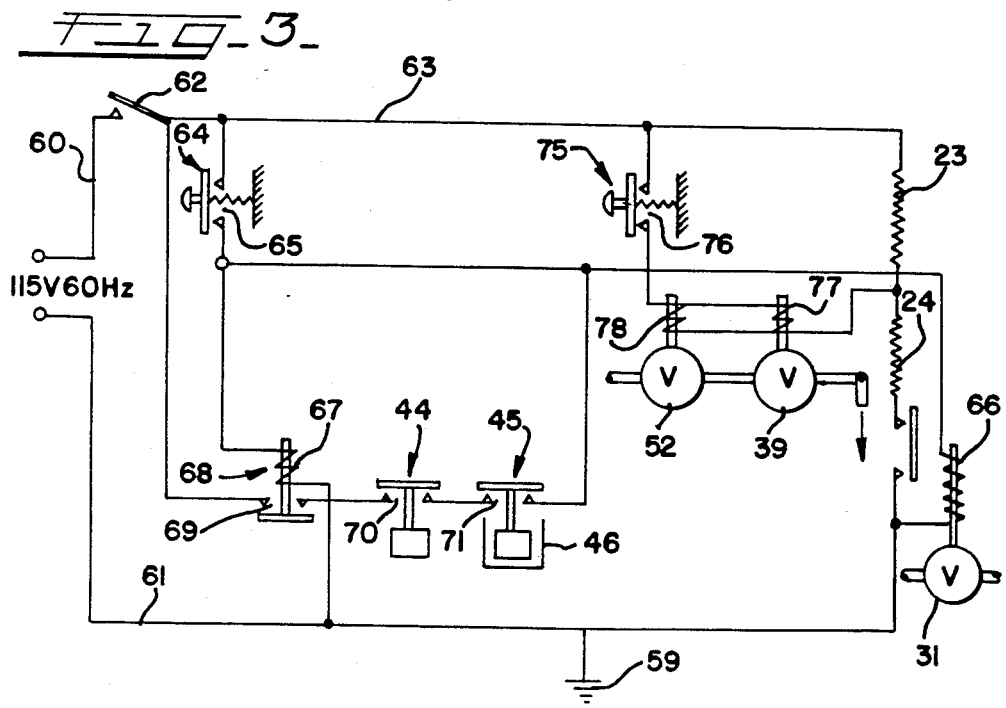
FIG. 3 is a diagrammatic electrical circuit for the cold water supply and hot water replacement system of the combined beverage brewer and hot water dispenser shown in FIGS. 1 and 2.

The manner in which the combination brewer and hot water dispenser 10 operates will be described now in connection with FIGS. 2 and 3. The circuits employed for operating the brewer/dispenser 10 (not including its warmer 15) is diagrammed in FIG. 3 wherein conductors 60 and 61 are connected to a suitable current source operating at 115 volts, 60 Hz. A switch 62 interconnects conductor 60 and a conductor 63 and conductor 61 is grounded as indicated at 59. The automatic brewing cycle will be described first and then the operation of the hot water dispensing system will be described.

To start the brewing cycle switch 62 being closed, a start switch illustrated diagrammatically at 64 is operated so as to close normally open contacts 65 and thereby complete an obvious energizing circuit for the solenoid winding 66 and thereby open or actuate the solenoid valve 31. Closure of the contacts 65 by momentarily depressing the switch 64 also completes an obvious energizing circuit for a winding 67 of a holding relay indicated diagrammatically at 68. Thereupon the normally open contacts 69 are closed and a holding circuit is completed that permits the release of the start switch 64. It will be noted that the contacts 70 of the operating float level switch 44 and the contacts 71 of the safety float level switch 45 are connected in series in the holding circuit through the contacts 69. As long as the water level in the basin 18 does not reach the normal full operating level 47 in the case of float level switch 44 and does not overflow into the cup 46 in the case of the safety float level switch 45, the respective contacts 70 and 71 will remain closed and the holding circuit remains closed and completed.

Upon the actuation or energization of the solenoid operated valve 31, water commences to flow through the line 30 at a suitable rate controlled by the flow control valve 32. The stream of water discharges from the downturned leg 33 and enters the downturned leg of the siphon tube 34 so as to act as a jet and thereby discharge from the siphon tube 34 into the sump 26. Preferably, this sump is shielded by a splash guard 29 (FIG. 2). The jet effect prevents the incoming water from flowing upwardly through the siphon tube 34 and over into the fill tube 27. The incoming cold water continues to flow into the basin 18 until the level 47 is reached at which point the operating float level switch 44 functions to open the contacts 70. Thereupon, holding circuit is opened and the solenoid valve 31 is deenergized automatically and closes preventing further flow of cold water in the line 30. Once the cold water stream stops flowing through the downturned leg 33, the jet effect terminates and the head of water within the basin 18 with the level 47 being above the bight of the siphon tube 34 the water begins to flow through the siphon tube 34, and discharge into the cold water fill tube 27. Once the flow has been initiated in the siphon tube 34, it continues until the water is siphoned from the basin 18 leaving only a small puddle underneath the inlet to the siphon within the sump 26.

It will be understood that if for some reason there is a failure in the normal operation of the fill and dump cycle for the basin 18 and incoming cold water continues to flow and rises above the normal operating level 47, an upper level will be reached at which the water overflows into the cup 46. Thereupon, the safety float control switch 45 will be actuated and the contacts 71 will open thereby deenergizing the solenoid control valve 31.

The cold water introduced into the basin 18 in normal operation is the amount that is required to produce a batch of coffee. This quantity of cold water flows by gravity downwardly through the tube 27 and displaces a corresponding amount of hot water from the upper portion of the tank 22 in known manner. As is well known, the mixing the cold water discharging from the tube 27 with the hot water is minimized. Once the hot water in the tank 22 rises above the inlet opening into the fitting 37 the hot water starts to flow through the hot water line 36 and discharge from the sprayhead nozzle 38 into the brewing funnel 21. This brewing funnel will have been provided with a disposable paper filter and a charge of ground coffee in the usual manner. The hot water will continue to flow through the tube 36 until cold water has stopped flowing through the inlet tube 27 and the hot water level which has temporarily risen in the hot water tank has dropped to the level of the inlet opening in the fitting 37.

At any time it is desired to dispense hot water through the faucet 41, whether or not the automatic brewing cycle is or is not in progress, the dispensing switch 75 (FIGS. 1 and 2) is operated (i.e. held in) thereby closing contacts 76. Upon closing the contacts 76, it will be seen that a circuit is completed through the windings 77 and 78 of the solenoid operated valves 39 and 52 respectively. Upon the opening of the valve 52, cold water will be allowed to flow through line 50 into the bottom of the tank 22 and thereby displace and replace the hot water which is simultaneously allowed to flow through the hot water line 40 by actuation of the valve 39. As long as the switch 75 is held depressed, hot water will continue to flow from the faucet 41. It will be seen that the hot water dispensed through the faucet 41 does not interfere in any way with the operation of the brew cycle. If the brew cycle is not in operation when the hot water is being dispensed through the faucet 41, the incoming cold water through the line 50 directly displaces and replaces the hot water discharging through the line 40. Likewise, if the brew cycle is in operation, the cold water entering through the line 50 into the bottom of the tank 22 will suffice to displace and replace the hot water flowing through the line 40.

It will be apparent that once the switch 75 is no longer depressed the contacts 76 will open and the solenoid actuated valves 39 and 52 will be deenergized and closed.

As an alternative to employing the float level switch 44 to deenergize the solenoid operated valve 31 in the cold water inlet line 30 after the desired volume of cold water has been admitted, a timer of known type may be used to deenergize valve 31 as disclosed at 63 in the above-mentioned U.S. Pat. No. 4,464,981, the disclosure of which is incorporated by reference herein.

What is claimed is:

1. In a combination beverage brewer means and hot water dispenser means each said means being connectible to a source of cold water under pressure and said brewer having a hot water sprayhead and said dispenser having a hot water faucet each being independently connected in hot water receiving relationship to a common hot water reservoir tank, comprising:

a first cold water inlet line connected at its inlet end to a pressurized source of cold water with its discharge end having cold water delivering relationship with the lower portion of said hot water reservoir tank, a first hot water line connecting said sprayhead with the upper portion of said tank, a first solenoid operated valve disposed in said first cold water inlet line, first manual switch means for energizing and opening said first solenoid operated valve, and automatically actuated means for deenergizing said first solenoid operated valve after a predetermined quantity of cold water has flowed through said first cold water inlet line; and a second cold water inlet line connected at its inlet end to a pressurized source of cold water with its discharge end having cold water delivering relationship with the lower portion of said hot water reservoir tank, a second solenoid operated valve disposed in said second cold water inlet line, a second hot water line interconnecting the upper portion of said hot water reservoir tank and said hot water faucet, a third solenoid operated valve disposed in said second hot water line, and second manual switch means for manually simultaneously energizing and deenergizing said second and third solenoid operating valves.

2. In the combination called for in claim 1 said second cold water inlet line having included therein a flow control valve and a flow rate adjusting valve for balancing the flow rate in said second cold water inlet line with the flow rate in said second hot water line.

3. In combination with a beverage brewer comprising, a cold water basin, a first cold water inlet line which supplies cold water to said basin from a source under pressure, a first shutoff valve in said first cold water inlet line, means for opening said first shutoff valve to cause cold water to flow into said basin, means for closing said first shutoff valve when said basin is filled to a shutoff level, a hot water tank under said basin, means for heating water in said tank, means for discharging the cold water from said basin into the lower portion of said hot water tank after the water level in said basin had reached at least said shutoff level and said first shutoff valve has closed, and a first hot water line communicating between the upper portion of said tank and a sprayhead disposed to spray hot water onto ground coffee in a brewing funnel, means for dispensing hot water comprising, a second cold water line which supplies cold water to the lower portion of said hot water tank, a second shutoff valve in said second cold water line, a hot water dispensing faucet, a second hot water line communicating between the upper portion of said hot water tank and the inlet port of said faucet, a third shutoff valve in said second hot water line, and means for simultaneously opening said second and third shutoff valves when said faucet is opened and for simultaneously closing said second and third shutoff valves when said faucet is closed.

4. In the combination called for in claim 3, said means for closing said first shutoff valve being a float actuated switch disposed in said cold water basin so as to be actuated when said basin is filled to said shutoff level.

5. In the combination called for in claim 3, second means for closing said first shutoff valve in the event water in said basin rises to a predetermined level above said shutoff level.

6. In the combination called for in claim 5, said first-mentioned means for closing said first shutoff valve being a float actuated switch disposed in said cold water basin so as to be actuated when said basin is filled to said shutoff level, and said second means for closing said first shutoff valve being a second float actuated switch disposed in said cold water basin so as to be actuated when the water is said basin rises to said predetermined level above said shutoff level.

7. In a combination beverage brewer means and hot water dispenser means each said means being connectible to a source of cold water under pressure and said brewer having a hot water sprayhead and said dispenser having a hot water faucet each being independently connected in hot water receiving relationship to a common hot water reservoir tank, comprising:

a first cold water inlet line connected at its inlet end to a pressurized source of cold water with its discharge end having cold water delivering relationship with said hot water reservoir tank, a first hot water line connecting said sprayhead with the upper portion of said tank, first flow control means disposed in said first cold water inlet line and operative to allow a predetermined quantity of cold water to flow through said first cold water inlet line for delivery into said hot water reservoir tank; and a second cold water inlet line connected at its inlet end to a pressurized source of cold water with its discharge end having cold water delivering relationship with said hot water reservoir tank, second flow control means disposed in said second cold water inlet line, a second hot water line interconnecting the upper portion of said hot water reservoir tank and said hot water faucet, third flow control means disposed in said second hot water line, and means for simultaneously actuating said second and third flow control means whereby hot water withdrawn from said hot water tank and dispensed through said faucet is simultaneously replaced with cold water delivered to said hot water tank through said second cold water line.

* * * * *